Jan. 11, 1966  D. G. PROSSER ETAL  3,228,416
LIQUID CONTROL VALVE

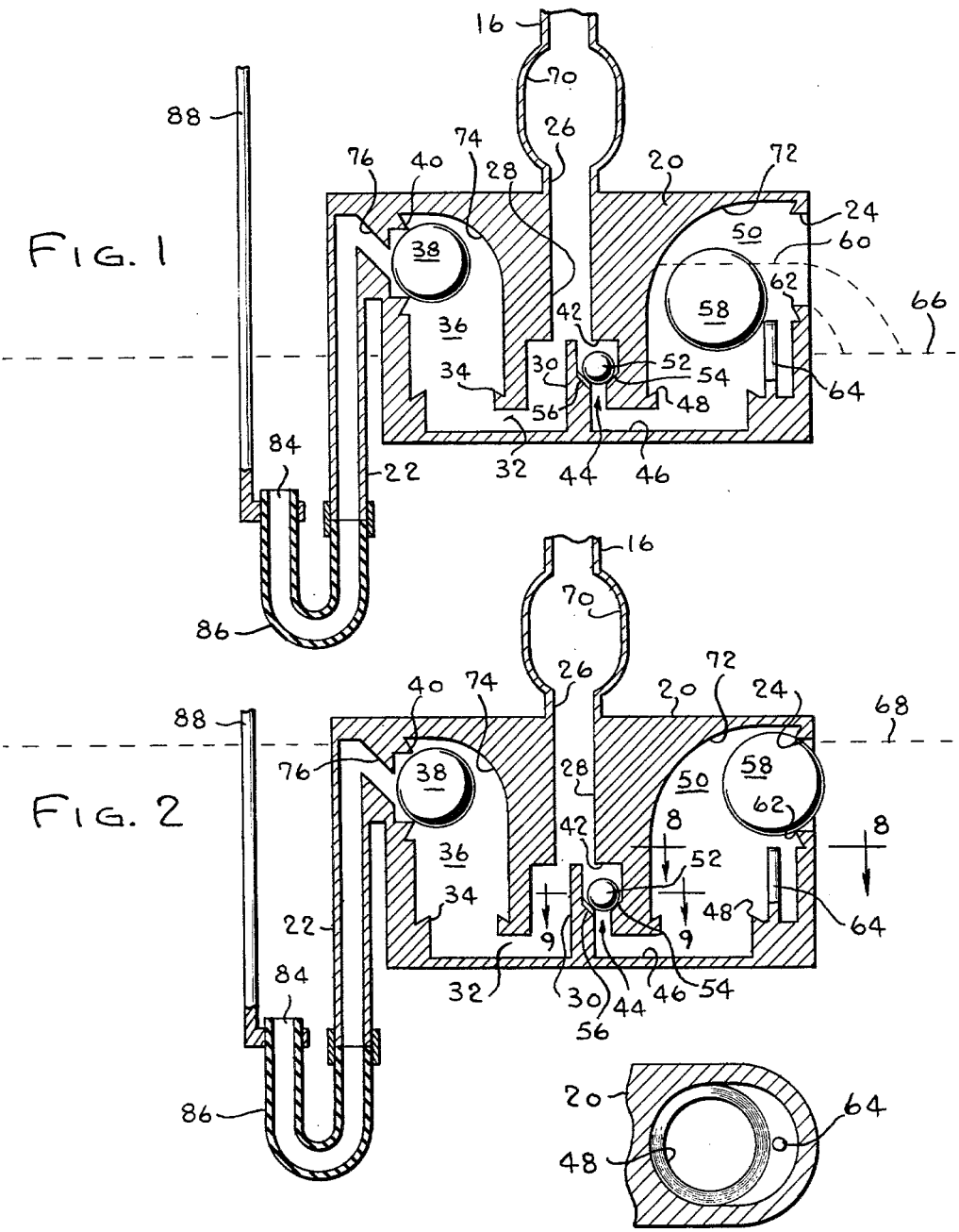

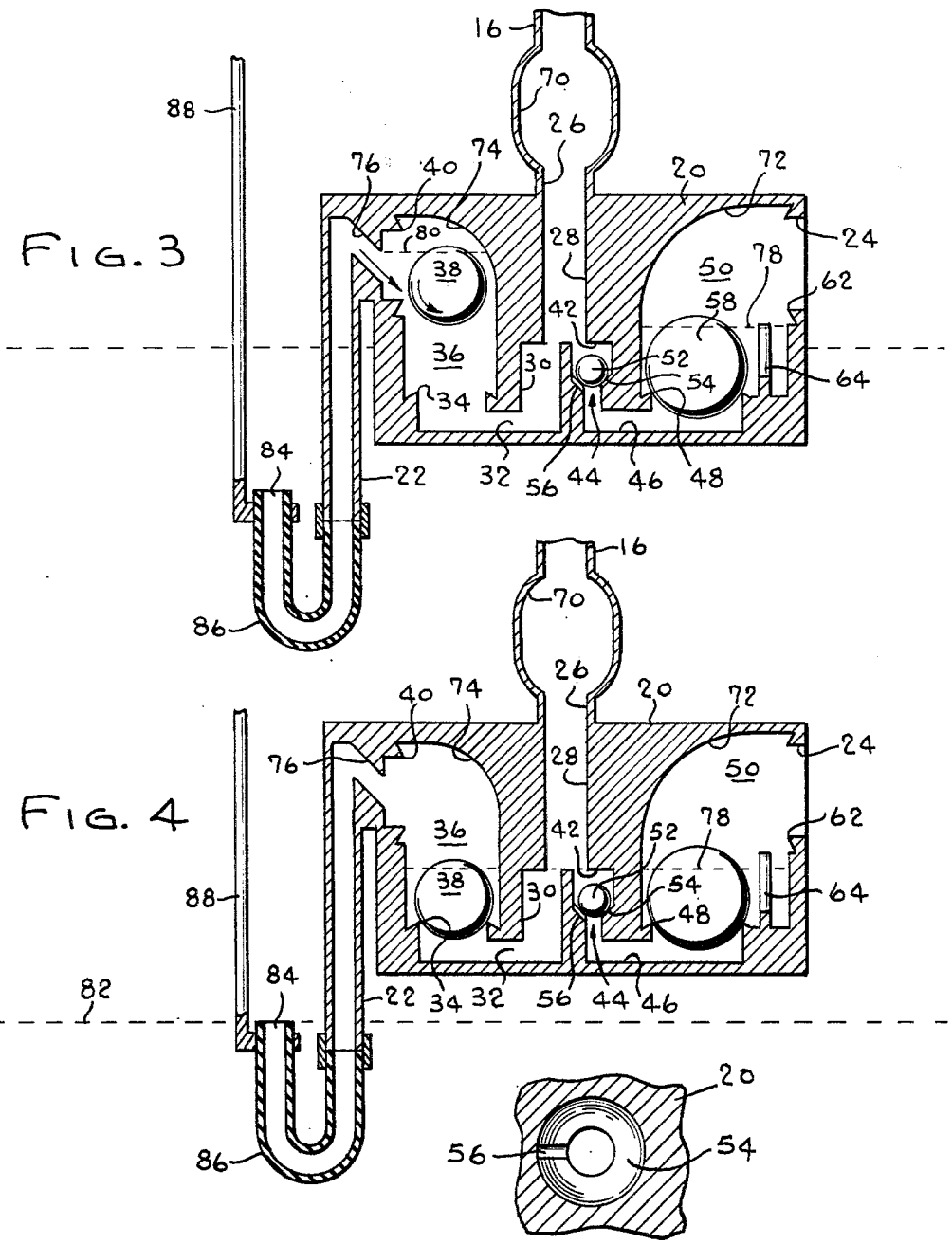

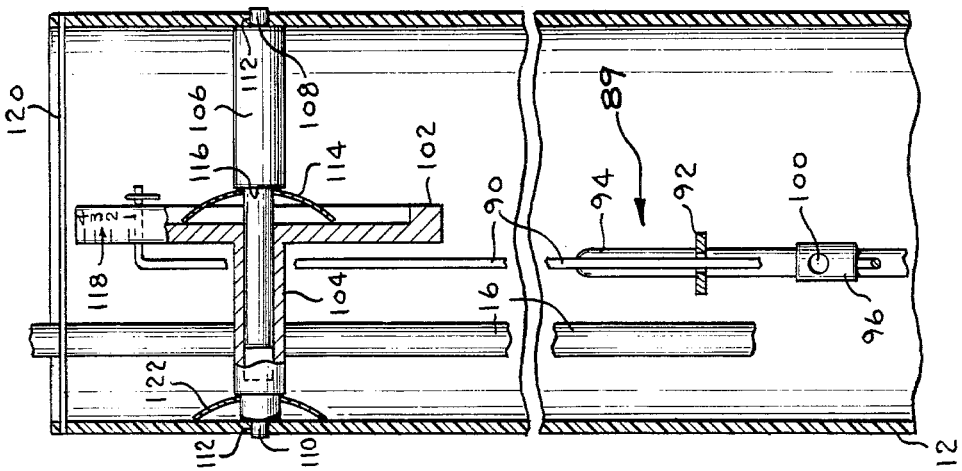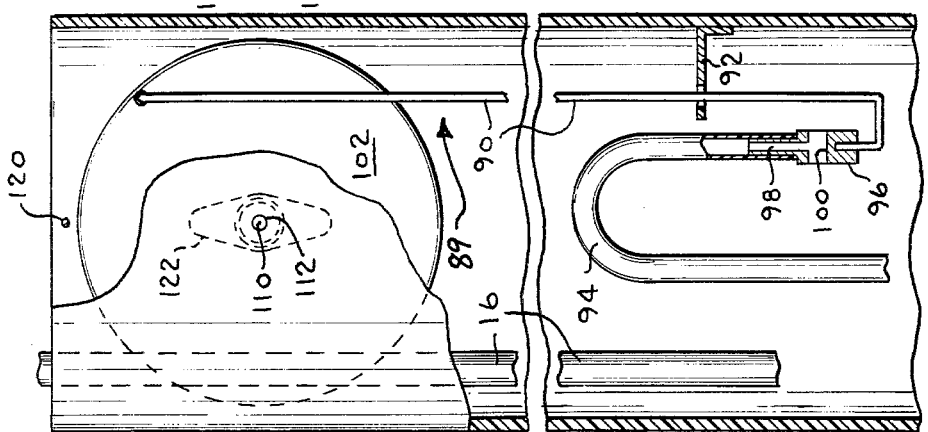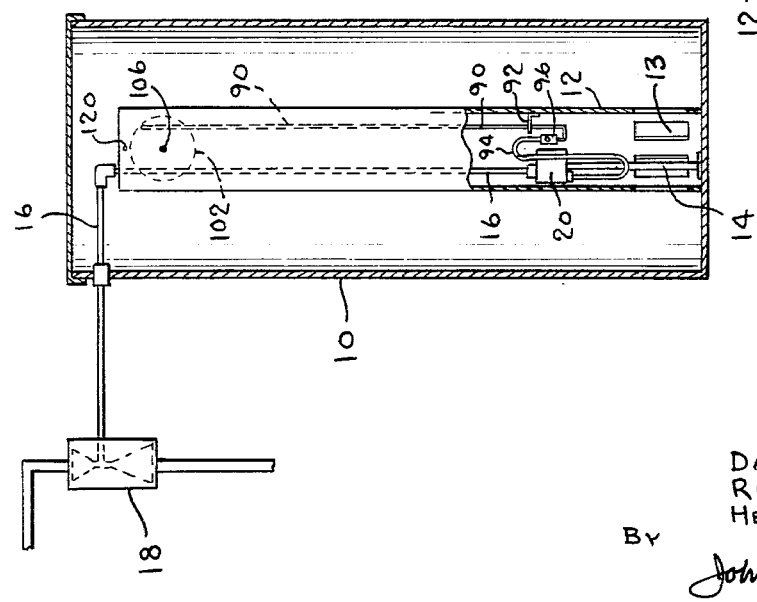

Filed Sept. 17, 1962  4 Sheets-Sheet 4

INVENTORS
DAVID G. PROSSER
RICHARD K. ENGHOLDT
HENRY F. ALFERY
By John W. Michael
ATTORNEY

United States Patent Office 3,228,416
Patented Jan. 11, 1966

3,228,416
LIQUID CONTROL VALVE
David G. Prosser, Mequon, Richard K. Engholdt, Wauwatosa, and Henry F. Alfery, Hales Corners, Wis., assignors to Erie Manufacturing Co., Milwaukee, Wis., a corporation of Wisconsin
Filed Sept. 17, 1962, Ser. No. 223,922
14 Claims. (Cl. 137—423)

This invention relates to a liquid control valve for controlling flow to and from a liquid receptacle.

While the invention has many applications it is particularly designed for use in a water softening system to control flow of a brine solution from a brine tank for regeneration of the water softening mineral, and to also control a return flow of water to the tank to replenish the brine solution drawn from the tank for regeneration.

Prior to this invention conventional valve arrangements for controlling brine draw-off and refill usually involved the use of float operated valves having a float member mounted exteriorly of the valve casing and operatively connected to one or more valve members to perform the desired function. The valves of such prior arrangements were necessarily of small size and were prone to misalignment and thus tended to leak particularly at low pressures. Also such arrangements were somewhat difficult to install and were prone to improper installation. Furthermore, they occupied a relatively large space and did not lend themselves to easy and accurate adjustment to permit pre-selection of the amount of brine used in the regeneration cycle.

The object of this invention is to provide a brine valve of reasonable cost which is not subject to the many shortcomings of the prior exterior float operated valves. As will be apparent from the following description of the present valve, such valve has the attributes of being extremely rugged, easy to install, compact in size, and particularly well adapted for brine adjustment. A further object of this invention is to provide a brine adjustment means of novel and improved design which may be employed to advantage on brine valves of various design.

The control valve of this invention is mounted inside a liquid receptacle and adapted to control the draw-off of a given amount of liquid from the tank and the subsequent refill of the tank to replace that drawn off.

The objects of this invention are attained by a control valve comprising a casing having a refill chamber and a draw-off chamber formed therein. A first port communicating with said refill and draw-off chambers is provided in the casing for admitting refill liquid to the casing and for carrying draw-off liquid from the casing depending on what phase of the operation is occurring at the time. A single conduit connected to such port carries refill and draw-off liquid to and from the tank. A refill port in the casing is provided for carrying refill liquid from the refill chamber into the tank and a draw-off port is also provided for admitting liquid from the tank to the draw-off chamber. A pair of floating valve members are mounted in the refill and draw-off chambers. Such valve members are of spherical shape and preferably are made of plastic having a density less than that of the liquid to be handled. The valve member or ball in the refill chamber is adapted to shut off flow from the refill chamber through refill port to the tank when the water level in the tank reaches a given upper level. The valve member or ball in the draw-off chamber is adapted to shut off flow from the tank through the draw-off port to the draw-off chamber when the level in the tank reaches a given lower level.

The lower level at which the valve in the draw-off chamber will shut off draw-off flow can be varied by providing a flexible tube connected to the draw-off port. The elevation of the open end of the tube in the tank is varied to thus vary the lower level to which liquid will be drawn off from the tank when a suction is applied at the first port in the casing. An adjustment means including a calibrated disc operatively connected to the free end of flexible tube is provided to accurately calibrate the amount of draw-off and refill liquid.

Other objects and advantages will be pointed out in, or be apparent from, the specification and claims, as will obvious modifications of the several embodiments shown in the drawings, in which:

FIGS. 1–4 are partially schematic sectional views of the valve of the present invention with the parts shown in the various positions they will assume during the operation of the valve;

FIG. 5 is a sectional view taken through a brine tank showing a typical installation for the valve of this invention;

FIGS. 6 and 7 are enlarged fragmentary sectional views of the brine valve installation shown in FIG. 5;

FIG. 8 is a fragmentary sectional view taken along line 8—8 of FIG. 2;

FIG. 9 is a fragmentary sectional view taken along line 9—9 of FIG. 2; and

Figure 10:
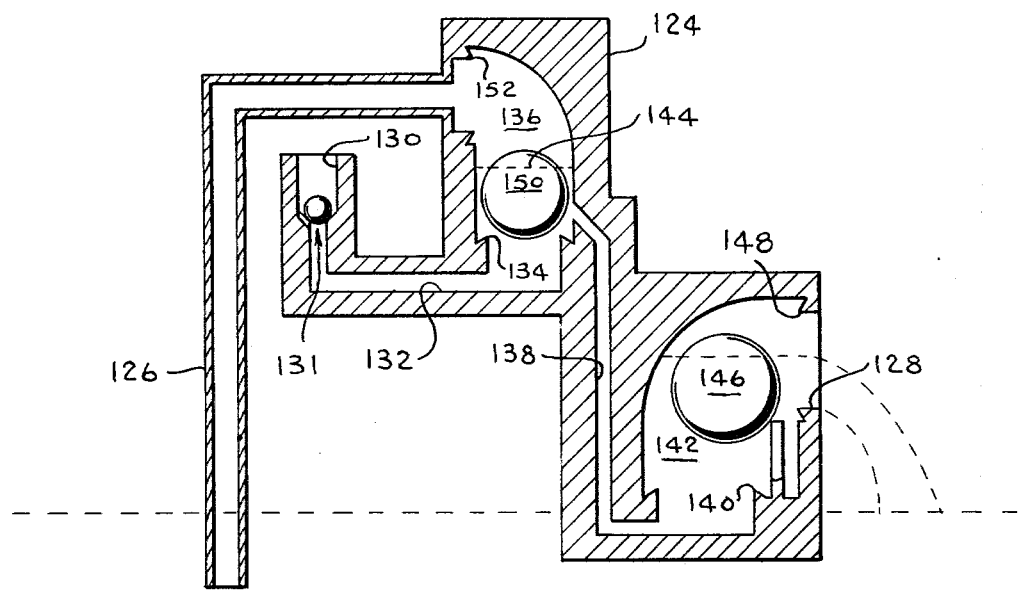
FIGS. 10 and 11 are partially schematic sectional views of two modifications of the valve of the present invention.

Referring now to the drawings, FIGS. 1–4 show one embodiment of the valve with the parts thereof in the various positions they will assume as the valve operates to perform the desired control functions.

FIGS. 5, 6 and 7 show a typical installation for the valve of this invention wherein it is installed in a brine tank 10 to control (1) the draw-off of brine for regeneration of the mineral bed of a water softening apparatus (not shown) and (2) the refilling of the brine tank with water to replenish that drawn off during brining. The valve is mounted in a cylindrical brine well 12 and supported therein by any suitable means such as by a support leg 14 as shown in FIG. 5. Well 12 is provided with a plurality of openings 13 therein to facilitate flow between the valve and the tank. A conduit 16 serves to carry refill water and brine draw-off to and from the valve, respectively. Conduit 16 is connected to an ejector 18 (shown schematically) which functions as a part of a water softener control system (not shown) to create a suction at the valve for brine draw-off and to direct water to the valve during water refill. The ejector and its associated control apparatus may be of any conventional type and as such form no part of this invention.

Turning now to the valve per se, it is comprised of a body 20 preferably of molded plastic having a brine draw-off inlet 22, a refill outlet 24, and a port 26 which serves both as a refill inlet and a brine draw-off outlet as will be explained. FIG. 1 shows the valve in its refilling position wherein refill water is carried to port 26 by conduit 16. The initial flow of refill water will pass through passages 28, 30 and 32 past seat 34 and into brine draw-off control chamber 36. This initial flow into chamber 36 will cause ball 38 to float up to the seat 40 and seat itself thereat to block flow through brine draw-off inlet 22 as shown in FIG. 1. Ball 38 is made of any suitable material, preferably plastic, which has a density less than the liquid to be handled by the valve.

The continued flow of refill water will pass from passage 28 into a chamber 42, past a unidirectional flow restricting means 44 through passage 46, past seat 48 and into a refill control chamber 50. Flow restricting means 44, the purpose of which will be explained hereinafter, is comprised of a ball 52 which cooperates with a seat 54 having a groove 56 therein as clearly shown in FIG. 9 through which refill water is forced to flow from chamber 42 to passage 46. Preferably ball 52 is made of a deformable material such as soft rubber. By using a deformable ball in combination with a seat 54 of relatively hard material and by properly shaping groove 56 with respect to the size of ball 52, a flow controlling function can be obtained. Thus, for example, if pressure in passage 28 would increase ball 52 would be deformed slightly into groove 56 and thus tend to keep the restricted flow through the groove relatively constant.

The flow of water from passage 28 into chamber 42 will seat ball 52 on seat 54 and thereby restrict flow into refill control chamber 50. Such restricted flow will cause ball 58 to float upwardly in chamber 50 to the position shown in FIG. 1. Ball 58 like ball 38 is preferably made of plastic having a density less than the liquid to be handled. With ball 58 in the FIG. 1 position, water will rise to the level 60 in chamber 50 and will flow therefrom past seat 62 through refill outlet 24 into the brine tank. An abutment in the form of a pin 64 positioned adjacent seat 62 prevents ball 58 from floating over to seat 62 to close up refill outlet 24. With ball 58 in the refilling position (FIG. 1) the discharge of liquid through outlet 24 will be equal to the flow through passage 46 into chamber 50.

Ball 58 will remain in the FIG. 1 position during the refill operation with the flow of water from chamber 50 out refill outlet 24 gradually causing the water level 66 in the brine tank to rise. The rising water level in the brine tank will eventually be effective to float ball 58 up over the end of pin 64 causing ball 58 to seat against seat 62 as shown in FIG. 2 when the level 68 is reached. Thus, when level 68 is reached the flow of refill water from ejector 18 into the brine tank 10 will be automatically shut off. The desired "full" water level in tank 10 can be set by the proper placing of the valve in the tank.

From the foregoing it will be apparent that the purpose of restricting means 44 is to prevent ball 58 from being prematurely carried to seat 62 by an unrestricted surge of refill water for example. A further problem of similar nature is caused by bubbles of air entrained in the liquid flowing to the valve which tend to cause premature seating of ball 58 on seat 62. To overcome this problem a deaeration cavity 70 is provided in the conduit 16 as shown.

It is noted at this point that the upper portion 72 of chamber 50 is curved towards seat 62 and that seat 62 extends within close proximity to the top of chamber 50. The curvature 72 of chamber 50 is provided to guide ball 58 towards seat 62 as the water level raises to insure proper seating of the ball on seat 62. The close relationship of seat 62 with the top of chamber 50 prevents entrapment of air in the top of the chamber as the ball raises therein and thus prevents such entrapped air from interfering with the proper movement of the ball to seat 62 when the water in the tank reaches level 68. It is also noted that the upper portion of brine draw-off chamber 36 is also curved as at 74 to insure proper seating of ball 38 on seat 40 upon initial refill flow.

With the bring tank filled as shown in FIG. 2, the system is now ready for the brine draw-off phase of the cycle which follows. Brine draw-off is initiated by the passage of water through ejector 18 which functions in a conventional manner to create a vacuum at port 26 of the valve. When a vacuum is thus applied balls 38 and 58 will float away from seats 40 and 62, respectively. Liquid will then be withdrawn from tank 10 through draw-off inlet 22, passageway 76, chamber 36, and passageways 32, 30 and 28 to port 26. Simultaneously, with such withdrawal through inlet 22, brine will be withdrawn from the tank through refill outlet port 24, past seat 62, through chamber 50, past seat 48, through passage 46, chamber 42, and passage 28 to port 26. Such flow will cause ball 52 to raise from seat 54 and thus will not be restricted by means 44 as is the case when flow is in the opposite direction. Ball 58 will drop in refill chamber 50 with the receding liquid level in the tank until the tank level reaches the bottom of outlet 24 at which time the ball 58 will continue to drop rapidly in chamber 50 until it reaches level 78 and then seats on seat 48 as shown in FIG. 3. With the ball 58 thus seated, air from the atmosphere will be prevented from entering the valve through chamber 50 and then be drawn up to the ejector 18 as brine draw-off continues through the valve from inlet 22. Ball 38 floats in draw-off chamber 36 at level 80 (FIG. 3) as draw-off from the tank continues until the liquid level in the tank drops down to the level 82 determined by the location of the inlet end 84 of flexible conduit 86 connected to inlet 22. When the liquid reaches level 82 air will be drawn into chamber 36 causing the liquid level 80 in chamber 36 to drop which, in turn, will cause ball 38 to float down to seat 34. Brine draw-off is thereby terminated automatically and at the same time air is prevented from passing to the ejector from chamber 36 by ball 38 seated on seat 34. It is noted that at this point (FIG. 4) the pressure in conduit 16 and passages 28, 30, 32, 42 and 46 is sub-atmospheric while the pressure in chambers 50 and 36 is atmospheric. The draw-off phase of the cycle is thus complete and the valve is in condition for refilling of the tank (FIG. 4).

It has been found that at certain flow rates and with certain valve dimensions the water entering chamber 36 from inlet 22 will tend to force ball 38 down towards seat 34 and sometimes cause premature seating of the ball on seat 34. To overcome this problem, water is directed into chamber 36 from inlet 22 through a passage 76 which is at an angle with the horizontal, as shown by the arrow in FIG. 3. The draw-off liquid thus directed will impinge on the ball 38 in a substantially tangential direction causing the ball to rotate in the direction shown. This rotation of the ball will tend to keep the ball floating in chamber 36 until draw-off is complete and thus prevent premature seating thereof which might otherwise occur.

From the foregoing, it will be apparent that the amount of liquid draw-off and subsequent refill will be equal to the volume of water in the brine tank between the level 68 of FIG. 2 and the level 82 of FIG. 4. It follows, therefore, that since the level 82 will be determined by the position of inlet end 84 of conduit 86, the amount of liquid draw-off (and refill) can be varied as desired by adjusting the height of inlet end 84. Such adjustment is facilitated by making conduit 86 of a flexible material and providing some means such as rod 88 to adjust the tube from the top of the tank.

While there may be many specific arrangements for adjusting and calibrating the amount of draw-off, a preferred arrangement for accomplishing this objective is shown in FIGS. 5, 6 and 7. Such level control means is designated 89 and includes a rod 90 mounted for vertical adjustment in the brine well 12 with the aid of a guide bracket 92 fastened to the inside wall of the well as shown. The rod is bent in a U at its lower end for connection to flexible conduit 94 by means of a fitting 96. Fitting 96 communicates the end of conduit 94 with the inside of the tank by an axial passage 98 which terminates at a cross port 100. Unlike the conduit 86 shown in FIGS. 1–4, conduit 94 is of substantially S-shape with one end connected to fitting 96 and the other connected to the draw-off inlet of the valve.

The mechanism for adjusting the height of cross port 100 in fitting 96 includes a disc 102 rotatably mounted in the upper end of well 12 and operatively connected to the upper end of rod 90. Disc 102 has a recessed bushing 104 formed thereon to receive a shaft member 106 in telescopic engagement therewith as clearly shown in FIG. 7. Projections 108 and 110 are formed on the ends of shaft 106 and bushing 104, respectively, for engagement in aligned holes 112 in the wall of well 12. The parts are biased axially into holes 112 by a spring washer 114 mounted between disc 102 and a shoulder 116 formed on shaft 106. The periphery of disc 102 is provided with calibrated markings 118 so that the rod can be adjusted to provide a specific amount of brine draw-off by simply reaching into the top of the brine tank and rotating disc 102 to the proper setting as determined by an indexing wire 120 fastened across the top of well 12 adjacent disc 102. A second spring washer 122 may be provided as shown to introduce sufficient friction against rotation of the disc to prevent it from getting out of adjustment once it has been set.

FIG. 10.—MODIFICATION

FIG. 10 shows a modified construction of the valve. The FIG. 10 modification is comprised of a body 124 having a brine draw-off inlet 126, a refill outlet 128, and a port 130 which serves both as a refill inlet and a brine draw-off outlet.

During refilling, water enters port 130 and flows past unidirectional restriction means 131 through a passage 132 past a seat 134 and into brine draw-off chamber 136. Restriction means 131 is of identical construction to that of means 44 previously described. From chamber 136 refill water flows through a passage 138 past a seat 140 and into refill control chamber 142 which is at a lower elevation from that of the brine draw-off chamber 136. Passage 138 is made of sufficient size so that refill water will be carried from chamber 136 to chamber 142 at a sufficient rate to prevent the level 144 in chamber 136 from raising therein during refilling. Thus, during refilling air entrained in the liquid will be removed from the stream in chamber 136 which acts as a deaeration chamber. As filling continues, ball 146 will eventually be floated up in refill chamber 142 to seat against seat 148 in the same manner previously described with respect to FIGS. 1–4. After ball 146 is seated the water level 144 in chamber 136 will raise causing ball 150 to float up to seat 152 and thereby end the refilling operation.

The operation of the brine draw-off cycle is the same as in the FIGS. 1–4 arrangement. It is noted, however, that at the end of the brine draw-off cycle with balls 146 and 150 seated on seats 140 and 134, respectively, the leak tightness of the system is dependent only on the seal between ball 150 and seat 134, as compared with the FIGS. 1–4 arrangement wherein leakage of air can occur at either seat 34 or 48.

FIG. 11.—MODIFICATION

Figure 11:
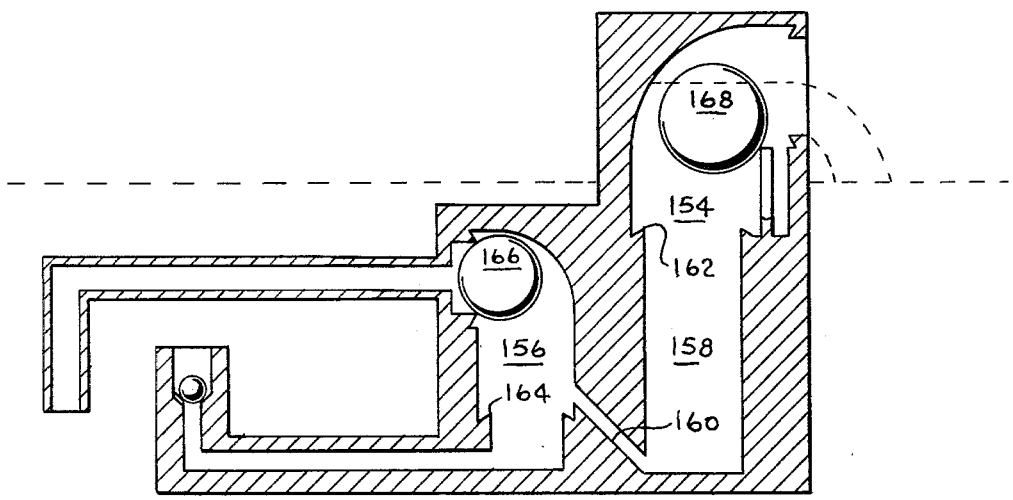

The modification shown in FIG. 11 is similar to that shown in FIG. 10 but includes an additional refinement. In FIG. 11 the refill chamber 154 is located at an elevation higher than that of draw-off chamber 156. An air trap cavity or well 158 is provided between passage 160 from chamber 156 and the seat 162 in chamber 154. With this arrangement chamber 156 will act as a deaeration chamber in the same manner as does chamber 136 in the FIG. 10 modification. Similarly, leakage after draw-off will occur only if there is leakage between seat 164 and ball 166 just as is the case in FIG. 10.

The additional advantage provided by the FIG. 11 modification is that it provides a certain amount of protection should there be leakage between ball 168 and seat 162 during brine draw-off. If such leakage occurs in either the FIGS. 1–4 or FIG. 10 arrangements, air will be drawn up to the ejector. In the FIG. 11 arrangement, however, air which leaks past seat 162 during draw-off will accumulate in well 158 and only after well 158 becomes filled, will air leak into the brine stream flowing to the ejector.

Although several embodiments of the present invention have been illustrated and described, it will be apparent to those skilled in the art that various changes and modifications may be made therein without departing from the spirit of the invention or from the scope of the appended claims.

We claim:
1. A liquid control valve adapted for mounting in a tank comprising:
   a housing having a draw-off chamber therein;
   a first port in said housing communicating with said draw-off chamber;
   a draw-off port in said housing for admitting liquid from the tank to said draw-off chamber;
   a draw-off valve member in said draw-off chamber adapted to shut off flow from the tank through said draw-off chamber to said first port when the liquid level in the tank reaches a given level; and
   level control means for adjusting said given level, said level control means including a conduit means open at one end and connected to said draw-off port, said conduit means adapted for movement with respect to said housing to permit vertical adjustment of said open end of said conduit means in the tank, said conduit means comprising a flexible tube connected to said draw-off port, said level control means further including a calibrated disc rotatably mounted in the tank and a rod member operatively connected between said disc and said flexible tube.

2. A liquid control valve adapted for mounting in a tank comprising:
   a housing having a refill chamber and a draw-off chamber therein;
   a first port in said housing for admitting refill liquid to said housing and for carrying draw-off liquid from said housing;
   a refill port in said housing for carrying refill liquid from said refill chamber to the tank;
   a draw-off port in said housing for admitting liquid from the tank to said draw-off chamber;
   a first valve member in said refill chamber adapted to shut off flow from said refill chamber through said refill port to the tank when the water level in the tank reaches a given upper level;
   a second valve member in said draw-off chamber adapted to shut off flow from the tank to said first port when the level in the tank reaches a given lower level;
   said first and second valve members being of spherical shape and made of a material having a density less than that of the liquid to be handled; and
   a unidirectional flow restricting means located between said first port and said refill chamber and adapted to restrict flow from said first port to said refill chamber but to permit unrestricted flow from said refill chamber to said first port.

3. A liquid control valve according to claim 2 in which said unidirectional flow restricting means includes a ball of readily deformable material and a seat of relatively hard material, said seat having a groove therein to permit a limited flow of liquid past said seat when said ball is in seated position thereon.

4. A liquid control valve adatped for mounting in a tank comprising:
   a housing having a refill chamber and a draw-off chamber therein;
   a first port in said housing for admitting refill liquid to said housing and for carrying draw-off liquid from said housing;
   a refill port in said housing for carrying refill liquid from said refill chamber to the tank;
   a draw-off port in said housing for admitting liquid from the tank to said draw-off chamber;
   a first valve member in said refill chamber adapted to shut off flow from said refill chamber through said refill port to the tank when the water level in the tank reaches a given upper level;
   a second valve member in said draw-off chamber adapted to shut off flow from the tank to said first port when the level in the tank reaches a given lower level;
   said first and second valve members being of spherical shape and made of a material having a density less than that of the liquid to be handled; and a de-aeration chamber connected to said first port through which liquid entering said first port must flow.

5. A liquid control valve adapted for mounting in a tank comprising:

a housing having a refill chamber and a draw-off chamber therein;

a first port in said housing for admitting refill liquid to said housing and for carrying draw-off liquid from said housing;

a refill port in said housing for carrying refill liquid from said refill chamber to the tank;

a draw-off port in said housing for admitting liquid from the tank to said draw-off chamber;

a first valve member in said refill chamber adapted to shut off flow from said refill chamber through said refill port to the tank when the water level in the tank reaches a given upper level;

a second valve member in said draw-off chamber adapted to shut off flow from the tank to said first port when the level in the tank reaches a given lower level;

said first and second valve members being of spherical shape and made of a material having a density less than that of the liquid to be handled;

a seat formed in said refill chamber against which said first valve member will seat when the water level in the tank reaches a given upper level; and an abutment in said refill chamber adjacent said seat to engage said first valve member and prevent premature seating of said valve member on said seat.

6. A liquid control valve according to claim 5 in which said refill chamber has a curved wall at the top portion thereof to guide said valve member towards said seat as the water level raises therein.

7. A liquid control valve adapted for mounting in a tank comprising:

a housing having a refill chamber and a draw-off chamber therein;

a first port in said housing for admitting refill liquid to said housing and for carrying draw-off liquid from said housing;

a refill port in said housing for carrying refill liquid from said refill chamber to the tank;

a draw-off port in said housing for admitting liquid from the tank to said draw-off chamber;

a first valve member in said refill chamber adapted to shut off flow from said refill chamber through said refill port to the tank when the water level in the tank reaches a given upper level;

a second valve member in said draw-off chamber adapted to shut off flow from the tank to said first port when the level in the tank reaches a given lower level;

said first and second valve members being of spherical shape and made of a material having a density less than that of the liquid to be handled; and said draw-off port communicating with said draw-off chamber through a flow passageway, said flow passageway adapted to admit flow into said draw-off chamber at an angle with the horizontal so that draw-off liquid admitted to said draw-off chamber will impinge on said second valve member and cause it to rotate.

8. A liquid control valve adapted for mounting in a tank comprising:

a housing having a refill chamber and a draw-off chamber therein;

a first port in said housing for admitting refill liquid to said housing and for carrying draw-off liquid from said housing;

a refill port in said housing for carrying refill liquid from said refill chamber to the tank;

a draw-off port in said housing for admitting liquid from the tank to said draw-off chamber;

a first valve member in said refill chamber adapted to shut off flow from said refill chamber through said refill port to the tank when the water level in the tank reaches a given upper level; and a second valve member in said draw-off chamber adapted to shut off flow from the tank to said first port when the level in the tank reaches a given lower level;

said first and second valve members being of spherical shape and made of a material having a density less than that of the liquid to be handled;

said refill chamber being located at a lower elevation than that of said draw-off chamber and said first port, draw-off chamber and refill chamber connected together so that refill flow from said first port to said refill chamber will pass through said draw-off chamber so that said draw-off chamber will serve to de-aerate said refill flow.

9. A liquid control valve adapted for mounting in a tank comprising:

a housing having a refill chamber and a draw-off chamber therein;

a first port in said housing for admitting refill liquid to said housing and for carrying draw-off liquid from said housing;

a refill port in said housing for carrying refill liquid from said refill chamber to the tank;

a draw-off port in said housing for admitting liquid from the tank to said draw-off chamber;

a first valve member in said refill chamber adapted to shut off flow from said refill chamber through said refill port to the tank when the water level in the tank reaches a given upper level;

a second valve member in said draw-off chamber adapted to shut off flow from the tank to said first port when the level in the tank reaches a given lower level;

said first and second valve members being of spherical shape and made of a material having a density less than that of the liquid to be handled; and an air trap well connected to said refill chamber through which any air flowing from said refill chamber to said first port must pass.

10. A liquid control valve according to claim 9 in which said draw-off chamber and air trap well are interconnected by a passageway, said passageway entering said air trap well at a lower elevation from that at which it enters said draw-off chamber, and in which refill flow from said first port to said refill chamber must pass through said draw-off chamber so that said draw-off chamber serves to deaerate said refill flow.

11. A liquid control valve adapted for mounting in a tank comprising:

a housing having a refill chamber and a draw-off chamber therein;

a first port in said housing for admitting refill liquid to said housing and for carrying draw-off liquid from said housing;

a refill port in said housing for carrying a refill liquid from said refill chamber to the tank;

a first valve seat formed in the upper portion of said refill chamber;

a draw-off port in said housing for admitting liquid from the tank to said draw-off chamber;

a first valve seat formed in the lower portion of said draw-off chamber;

a first valve member in said refill chamber, said first valve member being of spherical shape and made of a material having a density less than that of the liquid to be handled so that as the water level in the tank reaches a given upper level said first valve member will float up to said first valve seat in said refill chamber and be seated thereagainst to thereby shut off refill flow from said first port to said tank; and a second valve member in said draw-off chamber, said second valve member being of spherical shape and made of a material having a density less than that of the liquid to be handled so that as the water level in the tank reaches a given lower level said second valve member will float down to said first valve seat in said draw-off chamber and be seated thereagainst to thereby prevent draw-off flow from said tank to said first port.

12. A liquid control valve according to claim 11 in which there is a second valve seat positioned in the upper portion of said draw-off chamber against which said second valve member is adapted to seat upon initial refill flow from said first port to said refill port to thereby prevent flow from said first port out said draw-off port during the refill operation.

13. A liquid control valve according to claim 11 in which there is a second valve seat positioned in the lower portion of said refill chamber against which said first valve member is adapted to seat upon initial draw-off flow to thereby prevent air from being drawn to said first port during the draw-off operation.

14. A liquid control valve adapted for mounting in a tank comprising:
  a housing having a draw-off and a refill chamber therein;
  a refill valve seat formed in the upper portion of said refill chamber;
  a draw-off valve seat formed in the lower portion of said draw-off chamber;
  a first valve member in said refill chamber, said first valve member being made of a material having a density less than that of the liquid to be handled so that as the water level in the tank reaches a given upper level said first valve member will float up to said refill valve seat and be seated thereagainst;
  a second valve member in said draw-off chamber, said second valve member made of a material having a density less than that of the liquid to be handled so that as the water level in the tank reaches a given lower level said second valve member will float down to said draw-off valve seat in said draw-off chamber and be seated thereagainst.

References Cited by the Examiner
UNITED STATES PATENTS

| | | | |
|---|---|---|---|
| 2,695,626 | 11/1954 | Riche | 137—391 |
| 2,920,644 | 1/1960 | Schulze et al. | 137—391 |

ISADOR WEIL, *Primary Examiner.*

LAVERNE D. GEIGER, *Examiner.*